US008768153B2

(12) United States Patent
Bier et al.

(10) Patent No.: US 8,768,153 B2
(45) Date of Patent: Jul. 1, 2014

(54) HEATABLE LIQUID CONTAINER MADE FROM PLASTIC MATERIAL AND PRODUCTION METHOD THEREFOR

(75) Inventors: Volker Bier, Fronhausen (DE); Thomas Prinz, Wetter-Amoönau (DE)

(73) Assignee: Elkamet Kunstsofftechnik GmbH, Biedenkopf (DE)

(*) Notice: Subject to any disclaimer, the term of this patent is extended or adjusted under 35 U.S.C. 154(b) by 581 days.

(21) Appl. No.: 12/878,227

(22) Filed: Sep. 9, 2010

(65) Prior Publication Data

US 2011/0064394 A1    Mar. 17, 2011

(30) Foreign Application Priority Data

Sep. 11, 2009 (DE) .......................... 10 2009 040 930

(51) Int. Cl.
*A47J 27/00* (2006.01)
(52) U.S. Cl.
USPC .......................................................... 392/441
(58) Field of Classification Search
USPC ........... 392/441, 447–498; 422/198; 210/153; 219/200–208; 200/694; 285/41; 123/142

See application file for complete search history.

(56) References Cited

U.S. PATENT DOCUMENTS

| 3,719,796 | A | * | 3/1973 | Abildtrup | 219/449.1 |
| 4,730,099 | A | * | 3/1988 | Bleckman | 392/447 |
| 4,952,347 | A | | 8/1990 | Kasugai | |
| 6,508,271 | B2 | * | 1/2003 | Evanovich et al. | 137/549 |
| 6,712,234 | B2 | | 3/2004 | Boecker | |
| 6,713,009 | B2 | * | 3/2004 | Van Gilst | 264/263 |
| 2006/0213473 | A1 | | 9/2006 | Theorell et al. | |
| 2008/0277401 | A1 | * | 11/2008 | Hafner | 220/592.28 |

FOREIGN PATENT DOCUMENTS

| DE | 2542690 A1 | * | 9/1975 |
| DE | 10256727 | | 12/2002 |
| DE | 1022009040930 B4 | | 12/2002 |
| DE | 1565683 A | | 1/2007 |
| EP | 0143447 | | 10/1989 |
| EP | 1518791 | | 3/2005 |
| EP | 1557251 | | 7/2005 |
| EP | 1640577 | | 1/2007 |

OTHER PUBLICATIONS

DE1565683A; Buchholtz, Germany—1970.*
Crawford, Roy J. et al., "Rotational Molding Technology", 2002, 8 pages.
"Resettable Fuse", Wikipedia, en.wikipedia.org, Nov. 29, 2013, 3 pages.
Writ of Opponent received in parallel opposition proceedings in Germany, DE 10 2009 040 930.0, mailed Jan. 29, 2014, 16 pages.

* cited by examiner

*Primary Examiner* — Dana Ross
*Assistant Examiner* — Renee L Miller
(74) *Attorney, Agent, or Firm* — Pauly, Devries Smith & Deffner, L.L.C.

(57) ABSTRACT

A heatable liquid container made from plastic material, particularly for holding water/urea mixtures and having an internal cavity and a heating element arranged essentially in the internal cavity of the container, and with at least one connection end, the heating element is braced by a bracing element in at least one bearing area in the internal cavity of the liquid container. The heating element is supported in a horizontally floating manner by the bracing element. The bracing element is an insert part that is at least partially encased in the plastic material by sintering and is made from the same material as the inner wall of the liquid container.

9 Claims, 3 Drawing Sheets

HEATABLE LIQUID CONTAINER MADE FROM PLASTIC MATERIAL AND PRODUCTION METHOD THEREFOR

PRIORITY

This application claims the benefit of German Application No. 10 2009 040 930.0-13, filed Sep. 11, 2009, which application is hereby incorporated by reference in its entirety.

FIELD OF THE INVENTION

The invention relates to a heatable liquid container made from plastic material, for example thermoplastic materials such as polyethylene (PE), cross-linked polyethylene (XPE), polypropylene (PP), polyamide 6, 11 or 12 (PA 6, PA11 or PA12) or similar, particularly for holding water/urea mixtures, having a heating element that is arranged essentially in the internal cavity of the container and has at least two connection ends, wherein the heating element is braced by a bracing element in at least one bearing area inside the liquid container.

BACKGROUND OF THE INVENTION

Regulations governing emission limits for combustion engines, particularly in motor vehicles, are becoming increasingly stringent. Among the methods used to satisfy these requirements, catalytic converters are installed for after-treatment of exhaust gases by selective catalytic reduction (SCR) of the nitrogen oxides ($NO_x$) contained in the gases. Ammonia must also be introduced so that the reaction can take place in the catalytic converter. This is assured by controlled injection of an aqueous solution of urea from a reservoir in the vehicle. Environmentally harmful nitrogen oxides are almost entirely converted into steam and atmospheric nitrogen. The industry has given this urea solution the name AdBlue®, or DIESEL EXHAUST FLUID (DEF) in the United States. Since the urea solution is susceptible to gelling and even freezing at low temperatures, the known liquid containers provide for the integration of heating elements inside the liquid container. This also enables urea solution that has already frozen to be thawed, for example when cold starting.

A heatable plastic tank in which a heat radiating heating coil is located inside the tank to heat the liquid in the container is known from EP 1 640 577 B1. The heating coil disposed in the base area of the container protrudes from the tank in two places, where it is connected permanently to two insert elements, these being encased in the plastic of the container wall. The heating coil is also supported in the base area. For this purpose, an area of the inner wall of the tank serves as a bracing element, and the heating coil is permanently enclosed in the plastic of the tank wall in the support area by sintering.

A similar bracing arrangement is also disclosed in DE 102 56 727 A1, which also describes a container for holding urea solutions with a heating element for controlling the temperature of a urea solution, in which the heating element is arranged in the base area of the container to make better use of the rising heat and is attached by fixing elements that are welded to the inner wall of the container. The fixing elements hold the heating element in such manner that it remains in a fixed position even when subjected to the strong vibrations caused by uneven road surfaces, such as occur when motor vehicles are operated regularly. Among various suggestions for preventing corrosion, the fixing elements may be made from an aluminium material and welded to the heating coil.

However, one disadvantage of such bracing and attachment devices for the heating coil inside the plastic tank is that it is impossible to prevent thermal expansion of the material as a result of the heat experienced during subsequent operation. This particularly affects the heating element, which is susceptible to expansion when warming up. Yet the same consideration also applies to the liquid container itself, since changes in length can occur here too, for example due to shrinkage following demoulding, or as a result of thermal expansion induced by thermal input. Material deformations in the known liquid containers may lead to relative movement between the bracing area and the connecting area for the connection ends of the heating coil. Since the attachment between the heating element and the liquid container is fixed, this can create stresses in the liquid container wall. In addition, particularly vehicles are not operated all the time, and temperature fluctuations may occur even during operation, and repeated heating and cooling cycles cause a kind of alternating stress. This subjects the container wall to dynamic loads that are constantly deforming the component. Depending on the material or construction of the container, this may result in cracks being formed, particularly at the critical fixing points, which in turn entails the risk of leaking.

It is further known to support the heating element on metal retaining clips at least portions of which have been encased in the plastic inside the container by sintering. In this case, however, liquid gets into the space between the metal retaining clips and the plastic wall by capillary action, which may possibly result in seepage leaks through which the liquid may escape from the container.

SUMMARY OF THE INVENTION

The present invention provides a liquid container equipped with a temperature control system that is capable of compensating for the effects of deformations and ensuring that the container remains permanently sealed.

According to the invention described herein, the heating element is not fixed immovably in the bearing area inside the liquid container, but is supported in bracing element so as to be horizontally floating (floating bearing), and that the bracing element has the form of an insert, at least part of which is encased in the plastic material by sintering, and is made from the same material as the inner wall of the container. The floating bearing addresses the problem of internal stress in the liquid container because the heating element is able to perform compensating movements relative to the bracing element. The heating element may shift horizontally, which is important both for shrinkage of the plastic material during demoulding and in the event of temperature fluctuations during subsequent operation. If the heating element is anchored immovably in the side walls of the liquid container, in the area of the connector ends for example, the result is a combination fixed-floating bearing for the heating element in the liquid container. In this way, the heating element is retained in an optimum position even when it is shaken violently, as happens particularly on unpaved roads. At the same time, the heatable liquid container is also able to sustain the naturally occurring, unavoidable expansions in the material without developing the internal stresses that cause leaks. Accordingly, such a bearing for the heating element also helps to prolong the service life of the liquid container. A liquid container of such advantageous design lends itself particularly to use in operating conditions in which wide temperature fluctuations and thus also changes in length occur in the liquid container and/or the heating element. Since the bracing element is also an insert in the bearing area inside the liquid container and is at least partially encased in the plastic of the liquid container, and is made from the same material as at least the inner wall of the liquid container, a particularly firm, leak-proof seal is created between the tank wall and the insert in this area. In contrast to the use of metal clamps, for example, which are merely enclosed in plastic, the materials of the insert and the container wall are combined in such manner that sintering creates a homogeneous bond, thereby preventing seepage leaks. Even in conjunction with multilayer containers it is advantageous if the insert and the plastic container layer have the same material properties, since this results in a particularly firm, leak-proof bond that utterly prevents the medium in the liquid container from seeping to the outside. When the insert is enclosed by sintering, additional attachment means such as screw plugs or the like may be dispensed with. O-rings or the like, such as are necessary for partially sintered metal bracing designs, are also no longer needed. The risk of a leak is significantly reduced, and at the same time a considerable cost reduction is realised.

In one embodiment, the bracing element is designed, for example by special moulding means, so that it is conformed integrally with the container wall from the outset, thereby avoiding additional components and the costs associated therewith.

Another embodiment of the invention provides that bracing element also has elastic properties to absorb oscillations, particularly in a direction perpendicular to the translational degree of freedom of the floating (locating) bearing, wherein this may be achieved with special properties of the insert or moulding, or a particular geometrical arrangement of the bracing element, or some other means. Vibration impacts may thus be absorbed advantageously.

In one embodiment, the heating element is located in the base area of the liquid container. The heat that generally rises from the base area thus heats all of the liquid in the liquid container very effectively. At the same time, it is also ensured that the liquid is heated reliably even when the container is only partly filled with liquid. Ideally, the heating element has a wound configuration, such as a heating coil or a meandering heating coil, thereby increasing the area of the heating element that radiates heat and improving the thermal input into the liquid.

In order to introduce heat into the system, it may be provided that the heating element is or contains an electrical conductor that is connected to a voltage source. Alternatively, the heating element may also be a heating line through which a fluid is passed. The coolant water that is heated by the combustion engine may then be used as heating fluid, thus providing a very simple, energy-saving heat supply option. Other media may also be passed through the heating element configured as a heating line to heat the water-urea mixture for example hot gases from the combustion process (exhaust) would also be conceivable. In general, many areas of application may be defined for such a system, such as use in motor vehicles or also in conjunction with ships' diesel propulsion units or similar. It has further proven advantageous if the heating element has at least one flange in the area of the connector ends thereof, or is attached detachably to at least one flange, the at least one flange being affixed to at least one wall of the liquid container. Thus for example the connector ends may each be attached individually to the tank wall. However, it is also possible to integrate both connector ends in one flange, which is secured to a wall of the liquid container. This flange may serve for example to minimise the conduction of heat into the walls of the liquid container, which helps to improve the efficiency of the heating system. At the same time, in conjunction with the floating bearing of the heating element inside the liquid container, it renders the heating element accessible for maintenance and repair work. The liquid container preferably also has means for attaching the at least one flange, in which case it has proven advantageous if at least one sealing means, for example an O-ring, is arranged between the flange and the liquid container, wherein the O-ring prevents liquid from escaping from the liquid container.

The present invention further includes a method for producing a liquid container according to the invention by rotomoulding. In a method of such kind, the heating element and the bracing element are attached via special mould inserts to a rotational mould that is supported in a primary and a secondary rotational axis. Then, the rotational mould is filled with plastic and rotated about the main and secondary axes. Then, heat is introduced into the rotational mould. This heat may be supplied for example by an oven. Unlike other processes, however, the heating element will not be embedded in the side walls of the liquid container by melting in the support area. Rather, only a portion of the bracing element is encased by sintering. The portion of the bracing element that has not been encased by sintering forms a floating bearing for the heating element.

The inventive idea also encompasses the production of a liquid container having two or more layers of plastic. The advantages of such plastic containers consist not only in their mechanical strength and insulating properties but also their resistance to the liquid they must hold. In a rotomoulding process of such kind to produce these liquid containers, in a first step the heating element and the bracing element are secured in a rotational tool supported in a primary and a secondary rotational axis. Then, the rotational mould is filled with a first plastic material and rotated about the primary and secondary rotational axes. Heat is then introduced into the rotational mould, causing a first layer to be created from the first plastic material. Afterwards, the rotational mould is filled again with the same or a different plastic material, set in rotation about the primary and secondary rotational axes, and heat is introduced again as in the previous step. These steps are repeated for each additional layer of plastic. All the while, this process too ensures that at least part of the bracing element is encased immovably in at least one wall of the liquid container during each of the melting stages.

In the following, the invention will be explained in greater detail with reference to an embodiment thereof and a drawing. In this context, all features that are described and/or illustrated represent the object of the invention both individually and in any combination with any other features, regardless of their summary in the claims or any retroactive application thereof.

DETAILED DESCRIPTION

Figure 1:
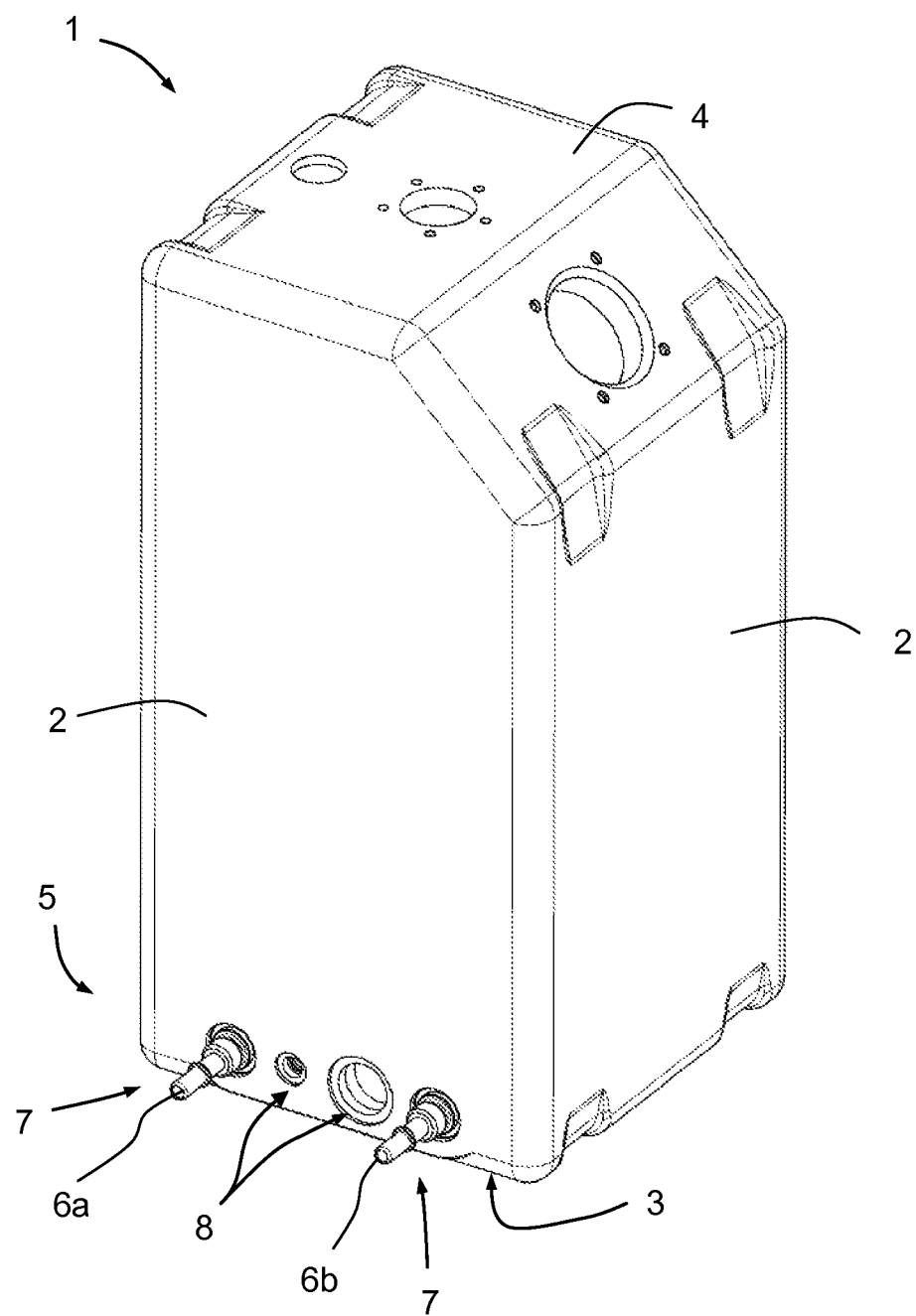
FIG. 1 is an external view of the liquid container according to the invention.

The liquid container 1 shown in FIG. 1 is initially formed by side walls 2, a lower container wall 3 and an upper container wall 4. Upper container wall 4 has one horizontal and one sloping section. Apertures are formed in each of the sections, and these may be used for example as filling and emptying apertures, but also as connection ports for additional devices such as fill level sensors, temperature gauges, or quality sensors. Connector ends 6a and 6b of a heating element 10 located inside liquid container 1 pass out through the lower area of container side wall 2, base area 5 of the liquid container 1. Connector ends 6a, 6b are each individually equipped with adapters 7 for connection to a suitable heat source, and are each separately encased in the container side wall in sealing manner by sintering. Further connection apertures 8 are also created to allow connection of other suitable devices as desired.

Figure 2:
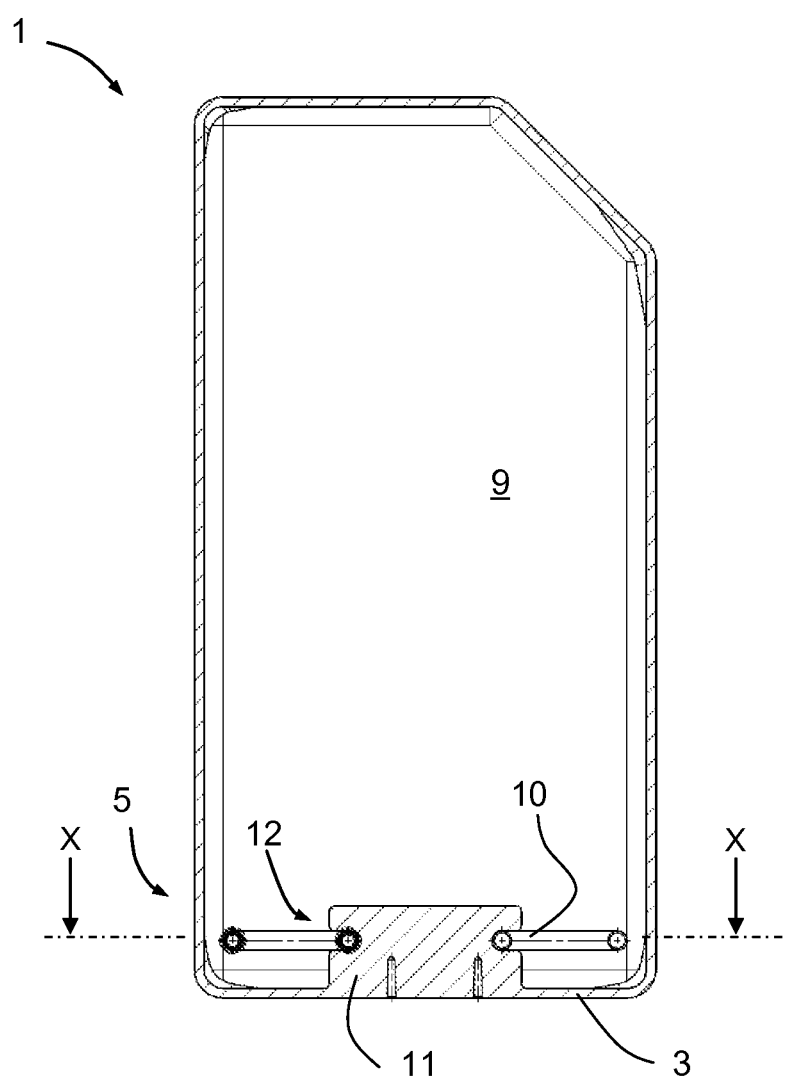
FIG. 2 is a vertical cross section through the liquid container of FIG. 1.
Figure 3:
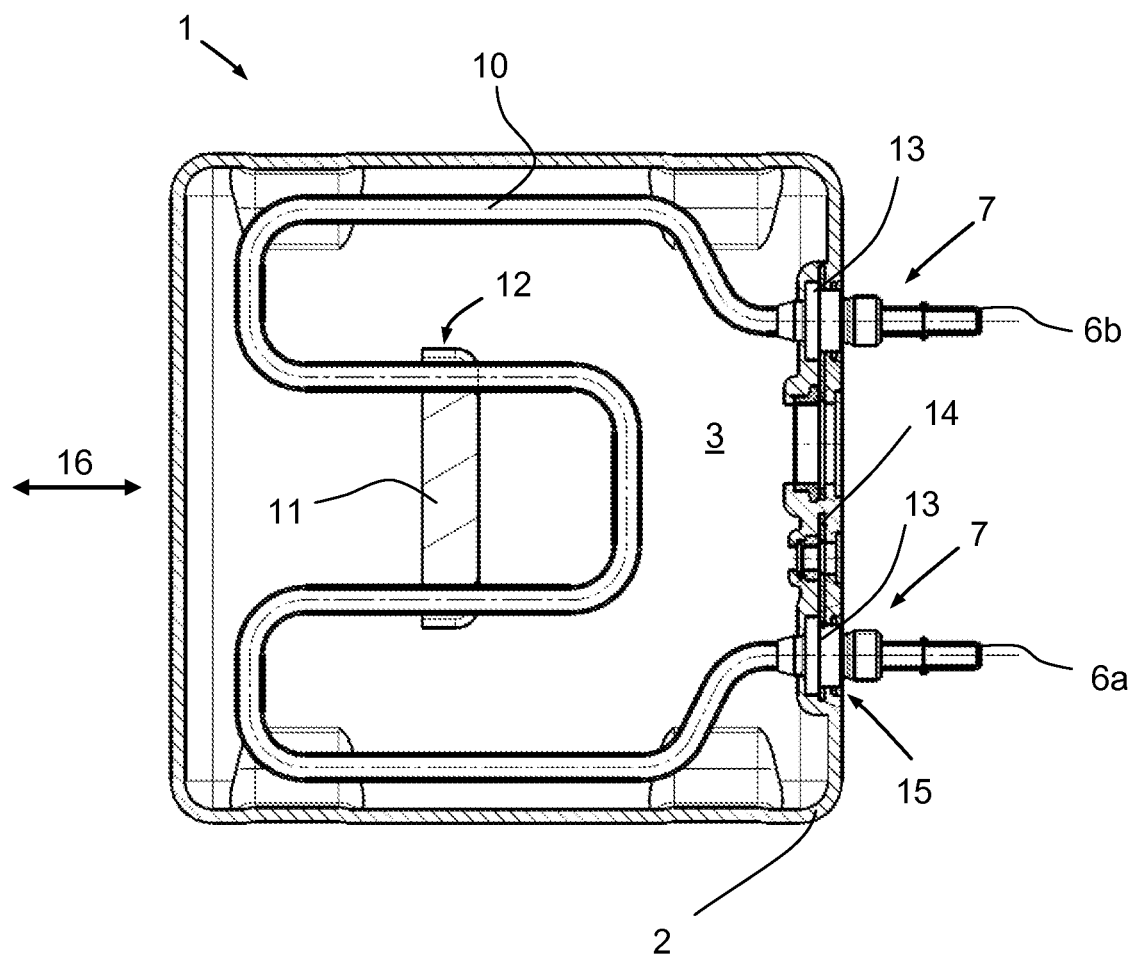
FIG. 3 is a cross-section along line X-X in FIG. 2.

FIGS. 2 and 3 illustrate the construction of liquid container 1 in the container interior 9. Heating element 10, here in the form of a heating coil, is located in base area 5 of liquid container 1 at a distance from lower container wall 3, wherein heating element 10 extends essentially over the width of liquid container 1. Heating element 10 is initially retained by the connector ends 6a, 6b shown in FIG. 1. However, a bracing element 11 is also arranged in base area 5. Bracing element 11 is furnished with U-shaped cutouts 12 in which heating element 10 is recessed. Bracing element 11 is also connected to the inner wall of lower container wall 3 in such manner that the bottom part of bracing element 11 is encased in the plastic of the lower wall 3 of liquid container 1 by sintering. This creates a particularly strong, leak-proof connection between bracing element 11 and lower container wall 3 without the need for additional fixing means such as screws and associated seals. The completely closed, integral base ensures that any medium in the container is totally unable to escape.

The bracing and bearing support for heating element 10 provided by bracing element 11 is illustrated more clearly in the horizontal cross-section according to FIG. 3. As is shown in FIG. 3, heating element 10 is in the form of a meandering coil. Heating element 10 opens into insert parts 13 on the right side as shown in FIG. 3, and insert parts 13 are enclosed in the plastic of side wall 2 by sintering and are connected to a heat conduction plate 14 for transferring heat to the other connector apertures, which may be used for example as feed ports. In addition, a seal 15 is inserted to prevent liquid from seeping between the plastic and the insert parts, and to ensure a tight, leak-proof connection and retention of heating coil 10 inside the container interior 9. Instead of being sintered, insert parts 13 may also be attached to wall 2 of liquid container 1 by means of a flange, not shown here. Connector ends 6a, 6b protrude from the side of wall 2.

Bracing element 11 is arranged centrally in the lower container wall 3 and supports an essentially straight section of heating element 10 in U-shaped cutouts 12. In this area of U-shaped cutouts 12, heating element 10 is able to move in the directions of arrow 16 relative t bracing element 11, which reflects the translational degree of freedom of the floating bearing between bracing element 11 and heating element 10. Heating element 10 is thus supported on a floating bearing inside bracing element 11. If the length of heating element 10 changes, for example as the result of material expansion in either direction of arrow 16, no stresses occur in the walls of liquid container 1 between the possible force transmission points in the connection of bracing element 11 to lower container wall 3 or in the area of the sintered connector ends 6a, 6b because the bracket for heating element 10 enables compensating movement in U-shaped cutouts 12. Heating element 10 is able to move in the direction of arrow 16 relative to bracing element 11.

As is further shown in FIG. 2, on the other hand heating element 10 is held in position vertically by U-shaped cutouts 12. During normal operation, particularly in conjunction with the attachment for heating element 10 in the area of connector ends 6a, 6b, this bearing assures the heating element 10 is held in place in liquid container 1 reliably and permanently in the manner of a fixed-floating bearing. This applies particularly in the event that pressure is applied from above by a frozen medium similar to a block of ice. At the same time, this construction also compensates for material expansions of the liquid container elements, which would otherwise cause stresses between the individual elements.

LEGEND

1 Liquid container
2 Side wall
3 Lower container wall
4 Upper container wall
5 Base area
6a, 6b Connector ends
7 Adapter
8 Additional connection apertures
9 Container interior
10 Heating element
11 Bracing element
12 Cutout
13 Insert parts
14 Heat conduction plate
15 Seal
16 Degree of freedom of bearing

What is claimed is:

1. A heatable liquid container made from a plastic material, having an internal cavity and a heating element that is arranged essentially in the internal cavity of the container and has at least one connection end, wherein the heating element is braced by a bracing element in at least one bearing area in the internal cavity of the liquid container, wherein the heating element is supported in a horizontally floating manner by the bracing element, that the bracing element is an insert part that is at least partially encased in said plastic material by sintering and is made from the same material as the inner wall of the liquid container.

2. The liquid container according to claim 1, wherein the bracing element is constructed as a single part with the container wall.

3. The liquid container according to claim 1, wherein the bracing element has elastic properties to absorb vibrations.

4. The liquid container according to claim 1, wherein the heating element is arranged in a base area of the liquid container.

5. The liquid container according to claim 1, wherein the heating element has at least one flange at the connector ends, or is attached to at least one flange, and that the at least one flange is attached to at least one wall of the liquid container.

6. The liquid container according to claim 5, wherein at least one sealing means is disposed between the flange and the outside of the liquid container to prevent leaks.

7. The liquid container according to claim 1, wherein the liquid container is produced in a rotomoulding process.

8. A method for producing a liquid container according to claim 1, in a rotomoulding process, in which
   a) the heating element and the bracing element are attached via mold inserts in a rotational mold supported in a primary and a secondary rotational axis;
   b) the rotational mold is filled with a plastic material;
   c) the rotational mold is set to rotate about the primary and secondary axes; and
   d) heat is introduced into the rotational mold;
   wherein at least a portion of the bracing element is encased permanently in at least one wall of the liquid container.

9. The heatable liquid container according to claim 1, wherein the container is suitable for holding water/urea mixtures.

\* \* \* \* \*